Aug. 26, 1952     A. RYDER     2,608,485
BREAD LOAF
Filed Aug. 25, 1950
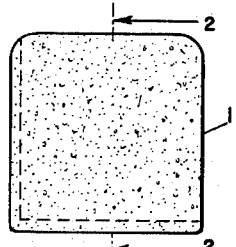
FIG. 1
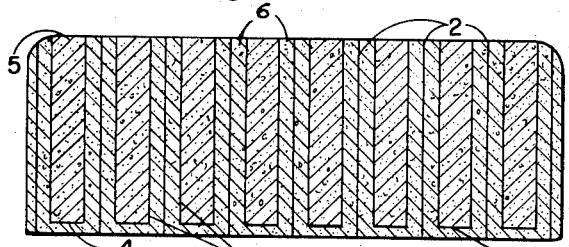
FIG. 2
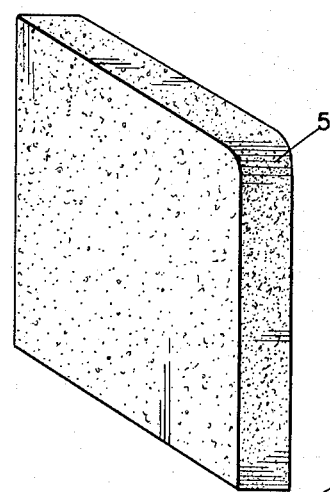
FIG. 3
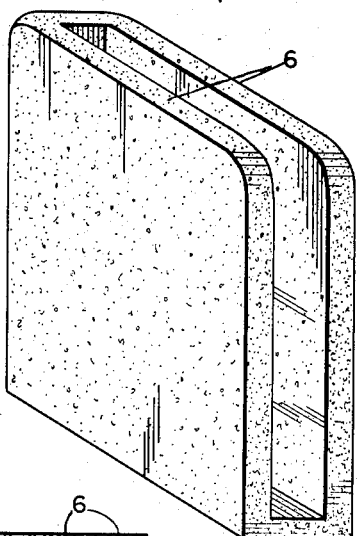
FIG. 4
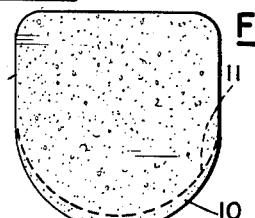
FIG. 5
FIG. 7
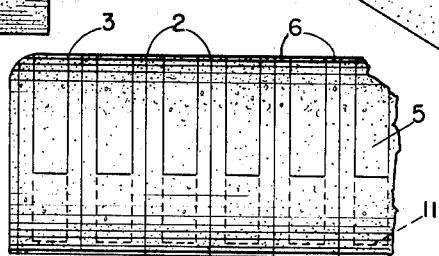
FIG. 6
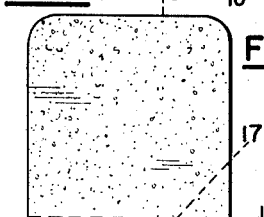
FIG. 9
FIG 10
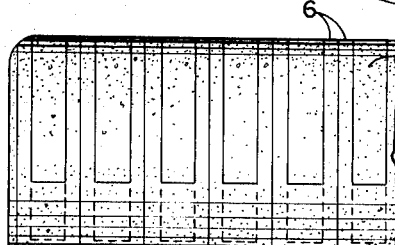
FIG. 8
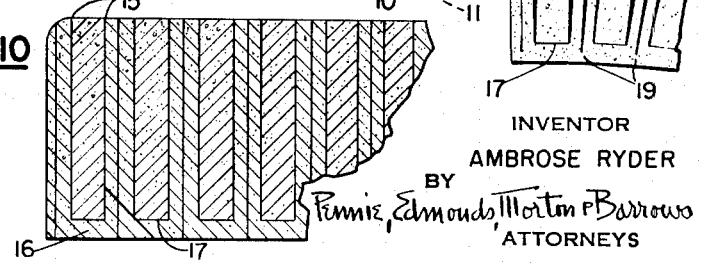
FIG. 11
INVENTOR
AMBROSE RYDER
BY Pennie, Edmonds, Morton & Barrows
ATTORNEYS Patented Aug. 26, 1952

2,608,485

UNITED STATES PATENT OFFICE 2,608,485

BREAD LOAF

Ambrose Ryder, Yonkers, N. Y.

Application August 25, 1950, Serial No. 181,347

6 Claims. (Cl. 99—87)

This invention relates to a pre-sliced loaf of bread for use in making sandwiches, particularly sandwiches wherein the filling of the sandwich is partly liquid or of a comminuted nature. The principal object of the invention is to provide a bread sliced for making sandwiches with soft filling so that the filling will not be extruded when the sandwich is eaten as is the case when the sandwich is formed in the ordinary manner of two completely separate slices of bread.

A further object of the invention is to provide a sandwich loaf of this nature wherein part of the pre-sliced loaf is composed of slices such as above described whereas other slices are the ordinary flat slices so that portions of a single loaf can be used for making sandwiches with a partly liquid or comminuted filling and other portions of the loaf can be used for making sandwiches of sliced meat, cheese or the like, which is not extruded in the eating of the sandwich.

A further object of the invention is to provide a pre-sliced sandwich loaf which requires no special apparatus for baking the loaf and which can be formed automatically by slicing machinery of simple design.

In the accompanying drawings,

Fig. 1 is an end view of a loaf of bread of conventional shape with certain of the cuts indicated in dotted lines.

Fig. 2 is a sectional view along the line 2—2 of Fig. 1;

Figs. 3 and 4 are perspective views on an enlarged scale of the two types of slices resulting from slicing the bread in the manner indicated in Figs. 1 and 2;

Figs. 5 and 6 are end and side views, respectively, of a round loaf sliced in a manner to produce alternate double and single slices of bread;

Figs. 7 and 8 are similar views of a loaf having a flat bottom and rounded top sliced in accordance with my invention;

Figs. 9 and 10 are similar views of a loaf sliced to produce double slices having one closed side only; and Fig. 11 is a detailed view showing an alternate method of forming single and double slices such as shown in Figs. 9 and 10.

Referring to the drawings, and particularly to Figs. 1 to 4 inclusive, I indicates a loaf of bread of conventional shape usually employed for sandwiches, namely, of square cross section with slightly rounded upper corners. In using a loaf of this shape for carrying out my invention the loaf is cut through at intervals after the manner of ordinary sliced bread, the cuts 2, however, being spaced apart a distance equivalent to three slices, preferably two thin slices and one of ordinary thickness. Between each of the slices so formed two cuts are made, as indicated at 3, these cuts extending in from one corner across the top and one side wall of the loaf to a distance of about one-half or three-quarters of an inch from the bottom and opposite side of the loaf, as indicated in dotted lines in Fig. 1. These cuts are spaced apart a distance to form a middle flat slice of bread which may be somewhat thicker, as shown, than the two connected slices in order to facilitate removing the inner slice without breaking.

In order to permit the removal of the inner slice, cuts 4 are formed in the loaf parallel with the bottom and side wall of the loaf connecting the cuts 3 so that the inner slice 5 is completely detached from the double slice 6.

In producing my pre-sliced loaf on a commercial scale the cuts 4 may be formed by thrusting into the loaf before it is sliced a series of narrow knives. The loaf so pierced is then sliced in a reciprocating slicer with the knives so shaped as to form the cuts 2 and 3 in the sequence indicated.

In Figs. 5 and 6 I have shown a round loaf sliced in a manner to produce single and double slices. As here shown, the cuts 3 between the single and double slices are formed with a circular rotating slicer of somewhat larger diameter than the loaf, to thereby leave along one side of the loaf a continuous wall of crescent shape as indicated at 10 in Fig. 5. To facilitate the removal of the flat slices the loaf is pierced with spaced knives curved to the same radius as the rotary slicers to form cuts of the shape shown at 11 in Fig. 5.

In Figs. 7 and 8 I have shown a loaf of conventional rounded top shape sliced to provide flat and double slices. The loaf shown in Figs. 7 and 8 is sliced in the same manner as the round loaf illustrated in Figs. 5 and 6, the loaf being inverted so that the rotary slicer knives descend through the bottom of the loaf toward the rounded top of the loaf when supported in inverted position.

While it is preferable to have the slices connected throughout approximately half their perimeters, the loss of filling is prevented in large measure by connecting the slices along one edge only and in Figs. 9 and 10 I have illustrated a standard loaf of conventional form cut to form such slices. This form of my invention has the advantage that the loaf may be sliced with an ordinary slicing machine consisting of spaced rotary slicing knives. To adapt a machine of this type to form the loaf shown in Figs. 9 and 10 the second and third knife of each three are of smaller diameter than the first knife of each three so that the second and third cuts, as shown at 15 in Fig. 10, do not extend all the way through the loaf but leave at the bottom of the loaf a connecting portion 16 to thereby form a double slice having one edge closed. It is preferable in forming a pre-sliced loaf such as shown in Figs. 9 and 10 to first pierce the loaf along lines parallel with the bottom of the loaf as indicated at 17 to thereby fully separate the flat slices from the double slices.

In Fig. 11 I have shown a loaf of bread cut to form double and single slices wherein all the transverse cuts forming the slices are of about the same depth and extend to within approximately one half inch of the bottom crust. The loaf is pierced at intervals as indicated at 17 to connect the second and third cuts of each group of three to thereby form the flat slices. These are easily removed by slightly opening the loaf as shown and the double slices may then be separated by cutting or tearing through the bottom crust at the points marked 19. To facilitate this separation the first cuts of each group may be slightly longer than the rest as indicated.

In the foregoing specification, I have described several alternate forms of my improved sandwich loaf but it is to be understood that my invention is not limited to the forms shown except in so far as defined in the appended claims.

I claim:

1. A sliced loaf of bread consisting of successive units each comprising two spaced apart slices joined together along at least one edge with a removable intermediate slice separated from the two spaced slices.

2. A sliced loaf of bread consisting of successive units each comprising two spaced apart slices joined together along two adjacent edges with a removable intermediate slice separated from the two spaced slices.

3. A loaf of bread having a portion of its surface of semi-cylindrical contour, said loaf having transverse cuts forming successive units each comprising two spaced apart slices joined together along the semi-cylindrical wall with a removable intermediate slice separated from the two spaced slices.

4. A bread unit for making sandwiches consisting of two slices placed apart a distance sufficient to receive the filling and joined together by an integral portion along at least one marginal edge, and a removable intermediate slice of a size suitable for making sandwiches separated from the two spaced slices.

5. A bread unit for making sandwiches consisting of two slices of substantially rectangular contour, said slices being spaced apart a distance sufficient to receive the filling and joined together by an integral portion along two adjacent marginal edges, and a removable intermediate slice of a size suitable for making sandwiches separated from the two spaced slices.

6. A bread unit for making sandwiches consisting of two slices having a portion of their perimeter of semi-circular contour, said slices being spaced apart a distance sufficient to receive the filling and joined together by an integral portion along the semi-circular portion of their edges, and a removable intermediate slice of a size suitable for making sandwiches separated from the two spaced slices.

AMBROSE RYDER.

REFERENCES CITED

The following references are of record in the file of this patent:

UNITED STATES PATENTS

| Number | Name | Date |
|---|---|---|
| 1,319,899 | Rafert | Oct. 28, 1919 |
| 1,600,191 | Mandelbaum | Sept. 14, 1926 |
| 1,797,856 | Doering | Mar. 24, 1931 |
| 1,807,189 | Bemis | May 26, 1931 |
| 1,847,062 | Lemmon | Feb. 23, 1932 |
| 1,975,031 | Wilkes et al. | Sept. 25, 1934 |